Sept. 1, 1964     W. FLEISCHER     3,146,812
PROFILING MACHINE
Filed Oct. 23, 1961     3 Sheets-Sheet 1

INVENTOR.
WALTER FLEISCHER
BY
ATTORNEY

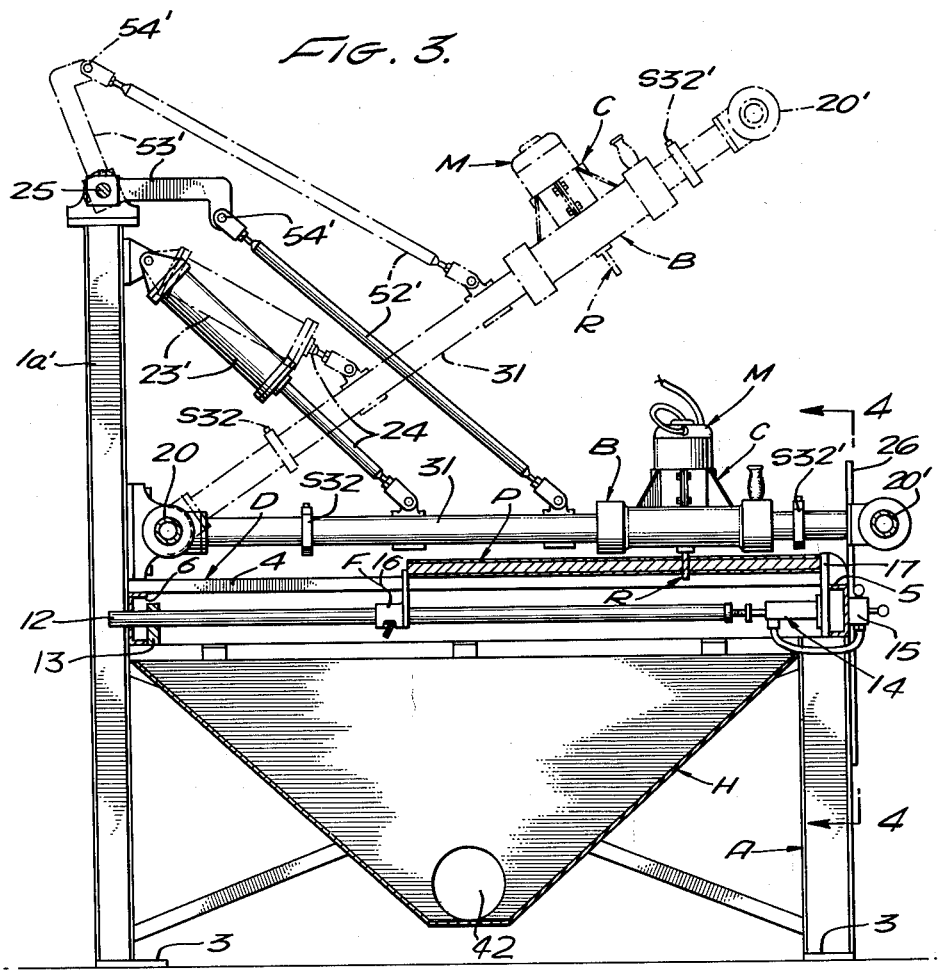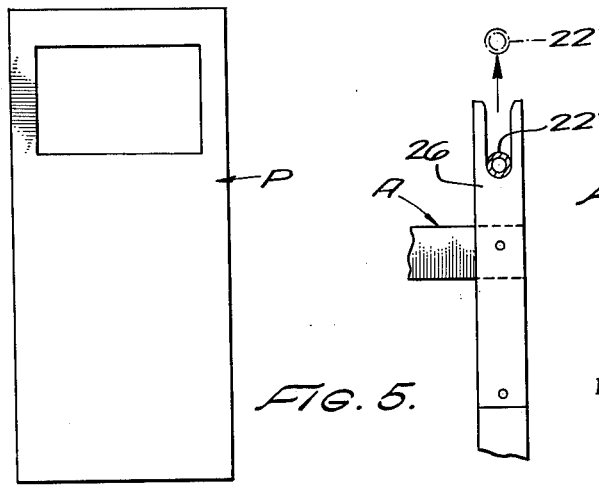

INVENTOR.
WALTER FLEISCHER
BY
ATTORNEY

United States Patent Office 3,146,812
Patented Sept. 1, 1964

3,146,812
PROFILING MACHINE
Walter Fleischer, 5615 Blackthorne Ave.,
Lakewood, Calif.
Filed Oct. 23, 1961, Ser. No. 147,105
8 Claims. (Cl. 144—144)

This invention relates to profiling apparatus and more particularly to machines or apparatus adapted to cut openings of various shapes and sizes in panels comprised of various metallic and non-metallic materials, and still more particularly to machines and apparatus adapted to cut openings of various geometrical shapes and sizes in laminated wood panels such as those of the size, shape and configuration utilized in the construction of doors.

In the cutting of openings of various geometrical shapes and sizes in panels of various sizes, shapes and configurations and of various metallic and non-metallic materials the major problems involved are to provide an apparatus in which the panels can be quickly and economically loaded and unloaded and secured in cutting position therein; to provide a cutting or profiling means that is quickly and easily adjustable to cut openings of various shapes and sizes and which is manually operable to cut said openings; and such a device or apparatus having a cutting means which can be readily changed, varied or replaced by a cutter which is specifically adapted to cut said openings in the particular material of which the panel is comprised.

The object of the present invention is to provide such a profiling device or apparatus or machine that solves these major problems.

Another object is to provide a profiling apparatus that is adapted to cut openings of various sizes, shapes and configurations in panels.

Still another object is to provide a profiling machine for panels which is adapted to cut openings of a desired or determined size, shape and configuration in a plurality of identical sized panels on a production schedule basis, thereby to materially lower the cost of production of the cut panels.

A further object of the invention is to provide, as one specific embodiment of the invention, a profiling apparatus for cutting window openings of various sizes, shapes and configurations in door panels comprised of laminated wood, said apparatus being adapted to handle the production of a large number of said door panels on an economically practical production basis.

Other objects and advantages of this invention will be apparent as the invention is hereinafter more fully disclosed generically and specifically in its adaptation to a device or apparatus for cutting window openings of various sizes, shapes and configurations in door panels comprised of laminated wood, on an economically practical production basis.

Before further disclosure of the invention, generically and specifically, reference now should be made to the accompanying drawings wherein is illustrated as one specific embodiment of the invention, but not as a limitation of the invention, the profiling apparatus of the invention as it has been adapted to the cutting of openings of various sizes, shapes and configurations in panels comprised of laminated wood of a size, shape and configuration commonly used for doors in the construction of buildings such as homes, office buildings and the like, said profiling apparatus being adapted to cut said openings in successive door panels on a large scale production basis.

Referring to the drawings:

FIG. 3 is a sectional view of the device taken along plane 3—3 of FIG. 2;

FIG. 4 is a sectional view taken along plane 4—4 of FIG. 3;

FIG. 5 is a top plan view illustrating a finished door product;

Figure 1:
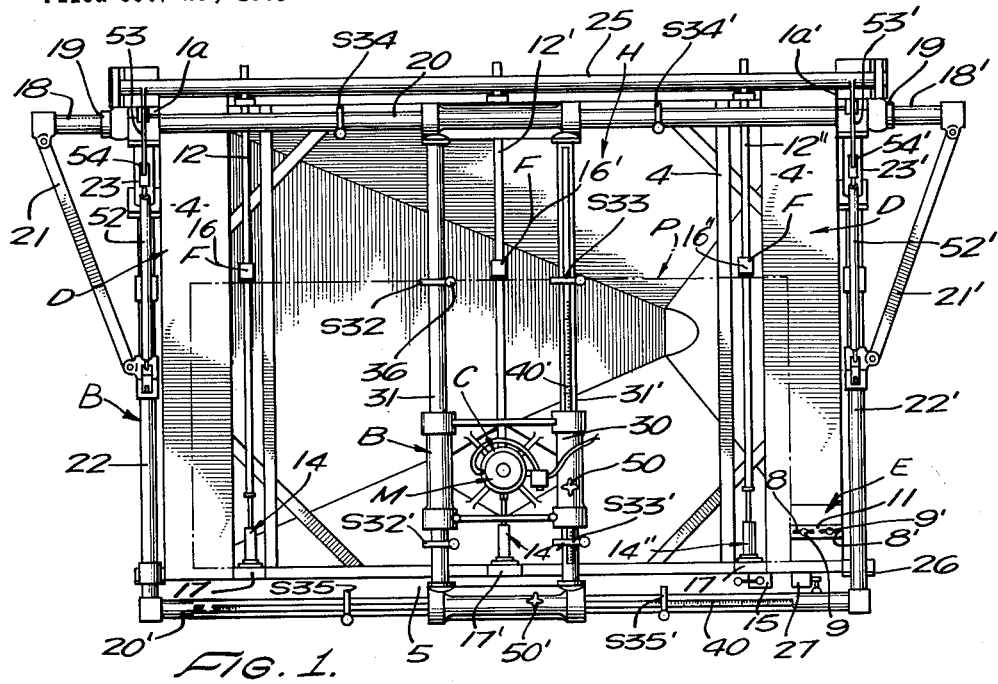
FIG. 1 is a top plan view of the device.
Figure 2:
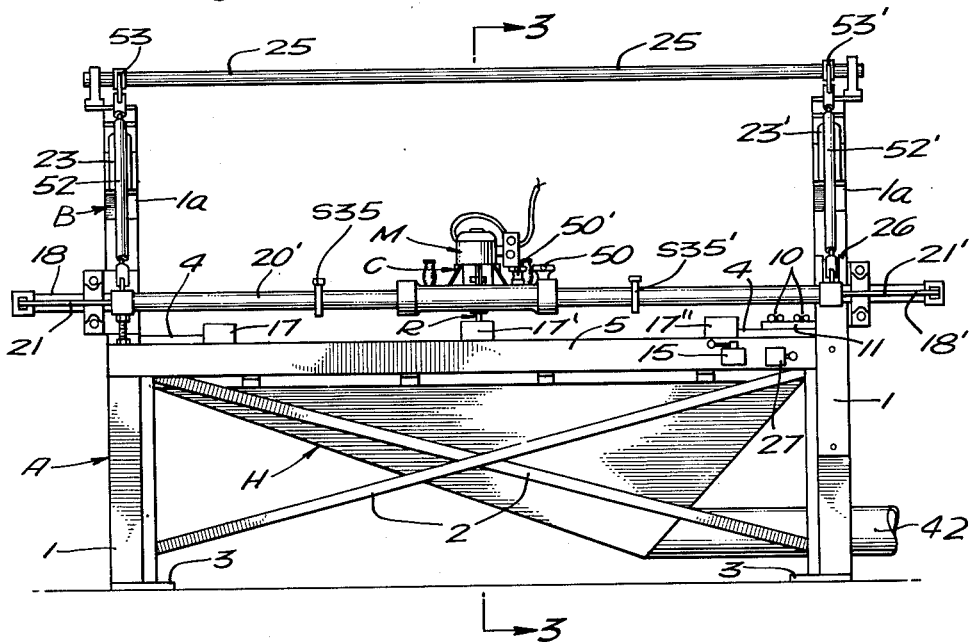
FIG. 2 is a front elevational view of the device.

The profiling apparatus illustrated in the drawings is one designed specifically for the profiling of substantially rectangular work-pieces to be converted into doors and comprises a bed frame A having a bed D and having a means F to releasably secure a door panel work-piece P thereon in a horizontal position; a cutting frame B hingedly mounted along one side to said bed frame A and means to actuate the cutting frame B from a horizontal cutting position overlying the door panel P to a vertically inclined position above the bed frame A and panel P thereby to permit the removal of the door panel P from the bed frame A and the placement of another door panel P thereon; a cutter means C mounted on said cutter frame B to be manually slidable transversely and longitudinally on the cutter frame B over the full width and length of the panel P and a stop means S—S and a template means T restricting and restraining the manually actuated transverse and longitudinal sliding movement of the cutter means C to define a profile cut of desired geometrical figure and predetermined size, shape and configuration in the panel P.

In association and combination with these basic operating elements of the present invention are other elements and means all of which will be identified and defined as the invention is hereinafter more fully disclosed.

The bed frame A consists essentially of a plurality of vertically sustained support members 1 sustained or retained in desired spaced relation by means of cross-bars 2, with each support member 1 being provided with a plate foot 3 adapting the bed frame A to be secured or anchored to a floor. The bed frame A is substantially rectangular in shape in this specific embodiment.

Bed D consists of a plurality of spaced bar members 4 secured in desired horizontal spaced relation on U-shaped channel members 5–6 mounted on the top of bed frame A along the front and rear sides thereof respectively. The bar members 4 are preferably mounted on the channel members 5–6 in such manner as to be movable thereon thereby to be positioned on opposite sides of the cut-out section to be removed from the panel P thereby to provide full support for the panel P without interference with the cutting tool of the means C.

As may be noted in FIGS. 1 and 3 the panel workpiece P, which in the instant specific embodiment consists of a laminated wood product substantially rectangular in shape and having the dimensional measurements adapting the work-piece for utility as a door in a house or office building, is disposed upon the bed D and is sustained thereon in a substantially horizontal plane. To secure the panel P in position on the bed D an adjustable stop means E is provided along one end of the bed D, preferably the right hand end as indicated in the drawings for the reason that normal feeding of material to a device is generally from left to right. This stop means E may be constructed in a plurality of different designs and mechanical arrangements without departure from the present invention and is provided for the purpose of facilitating the locating of successive panels P in the same position on the bed D. The adjustability is provided to adapt the bed D to utility with successive batches of panel work-pieces P of varying lengths.

The adjustable stop means E consists essentially of a stop member E slidably mounted by means of an elongated slot 8–8' and bolts 9–9' sustained in strap 11 anchored at one end to the bed frame A. The stop E may be secured in any adjusted position by means of wing nuts 10–10'.

The panel work-piece P is secured upon the bed D by means of an adjustable manually operative power actuated gripping means F. This means also may be widely varied without departure from the invention. In the specific embodiment illustrated this means consists of a manually operative compressed air actuated gripping means. As shown in the drawings this means consists of at least two and preferably three clamping rods 12, (12', 12") said rods being slidably mounted in bearings 13, (13', 13") at one end and connected at the other end to compressed air actuated reversible piston cylinders 14, (14', 14") connected in parallel to valve control means 15.

On each rod 12, (12', 12") is provided an adjustable panel grip member 16, (16', 16") to engage the side of the panel P upon actuation of the piston cylinders 14, (14', 14") to secure the opposite side of panel P against stops 17, (17', 17") along the front edge of bed frame A thereby to hold panel P against movement on the bed frame A while being worked upon by the cutter means C.

Referring now to the cutter frame B carrying the cutter means C, it is to be noted that this frame B is hingedly connected to the bed frame A at the rear of the frame A. This hinged mounting of the cutter frame B on the bed frame A can be accomplished in a plurality of ways without departure from the invention. In the specific embodiment illustrated the rear leg 1a–1a' of the frame A are upwardly extended a sufficient distance to provide two points of suspension for the cutter frame B.

The rear side of the cutter frame B is hingedly or pivotly mounted to the rear leg extensions at the appropriate desired horizontal level above the bed frame A, preferably by means of stub shafts 18–18', rotatively journaled in bearing mountings 19–19'. One end of each of the stub shafts 18–18' is secured to the rear tubular member 20 of the cutter frame B. The opposite end of each of the stub shafts 18–18' carry brace rods 21–21' connected at their ends to side tubular members 22–22' of the cutter frame B.

To actuate the cutter frame B upwardly about the pivot points thus provided and out of horizontal work engaging position to a position permitting panel work-piece replacement on the bed frame A air actuated piston cylinders 23–23' are provided. One end of each of the piston cylinders 23–23' is secured to the rear leg extensions and the opposite ends are secured to the side tubular members 22–22' of the cutter frame B by rods 24–24'. To maintain the rear leg extensions 1a, 1a' of the bed frame A in vertical alignment a top cross bar 25 is also provided which bar 25 is rotatively sustained by the leg extensions 1a, 1a'. To insure against cutter frame B being twisted due to the unequal distribution of weight on the frame B as the pistons 23–23' are actuated to lift the frame B, lift rods 52 (52') are provided. One end of each rod 52 (52') is pivotly secured to side tubular members 22–22' of the frame B and the opposite ends are connected to rotatable rod 25 by means of arm 53 (53') and loose link connector 54 (54'). To insure horizontal alignment of the cutter frame B over the bed frame A one side tubular member 22' engages slot 25 in tongue 26 mounted on bed frame A as the cutter frame B moves downwardly into horizontal operating position. The piston cylinders 23–23' are each connected in parallel to a source of compressed air through control valve 27 which is manually operative.

Referring now to the cutter means C mounted on the cutter frame B, it is to be noted that the frame B consists of four tubular members 20–20' and 22–22' forming a rectangular frame. The cutter means C is mounted on a frame 30 which is slidably mounted on parallel spaced tubular support members 31–31' whose opposite ends also are slidably mounted on the front and rear tubular members 20' and 20. Various substantially equivalent means for slidably supporting the cutter means C upon the cutter frame B may be provided without departure from the invention. The means illustrated in the specific embodiment adequately serves the purpose in view in that by means of adjustable stop means 32, 32' and 33, 33' on the parallel spaced tubular support members 31–31' and adjustable stop means 34–34' and 35–35' on the front and rear tubular members 20 and 20' of the frame B the extent of sliding movement of the cutter means C both laterally and longitudinally can be controlled and limited to any desired maximum. Each of these stops 32 to 35 consist of split tubular members of short length provided with a threaded bolt means 36 bridging the split for tightening the stop in stop position on its tubular member.

The cutting means, per se, is an electrically driven router bit R driven by motor M. This means, per se, is a means that is old and well known in the art and requires no specific disclosure for one skilled in the art. This means, per se, forms no part of the present invention except as an essential element of the combination of elements comprising the invention. The use of the motor-driven router bit as an essential element in this invention is apparent from the fact that the router bit cuts both vertically and horizontally or both and drills and cuts sideways when moved sideways in the drilled opening.

Router bits are available in the art in substantially any desired length and diameter and for boring and cutting substantially any kind and type of sheet, strip or multi-ply material. One skilled in the art is required under this invention to do no more than to select the proper router bit and to provide the proper motor power unit in adapting this invention to the making of cut-out openings in panel work pieces comprised of materials other than plywood. In the practice of this invention as illustrated in the specific embodiment the router bit employed is one sold under the trade name Stanley and has a length approximating 2½ inches and a diameter approximating ½ inch for door panels approximating 2¼ inches in thickness. Larger or smaller diameter router bits may be employed without departure from the invention depending upon the extent of arcing that may be tolerated at the corners of the cut-out sections.

To facilitate the locating of stops 32 to 35 limiting the lateral and longitudinal movement of the cutter means C on the cutter frame B, a scale 40 is provided along the upper face of the front tubular member 20' of the cutter frame B. The zero point of this scale is in alignment with the zero point of the adjustable stop means E. When the stop means E has been adjusted (or moved to the left) to its maximum limit, for example, the distance it is moved may be determined on the scale and this distance is added to the setting desired for the stops 34–35 limiting the longitudinal movement of the cutter frame C. A similar scale 40' may be provided along tubular member 31'.

It is believed apparent that when the stops 32 to 35 are located properly on tubular members 31–31' and 20–20', respectively, the path of sliding movement of the cutter frame 30 carrying the bit R and motor M is limited to a square or rectangular path laterally and longitudinally as long as the frame 30 is held manually pressed against the stop means 32 to 35 in each direction. In the space or area inwardly from these stops and within the cut-out section area the frame 30 can be moved manually in any desired direction.

Figure 6:
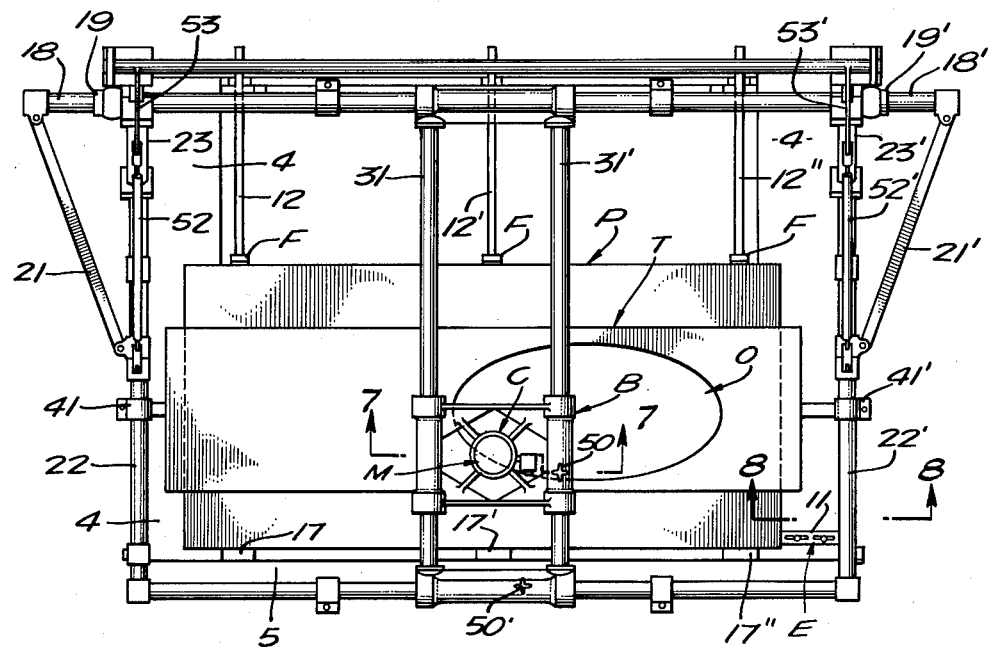
FIG. 6 is a top plan view of the device illustrating the means employed to cut openings of different sizes, shapes and configurations in the door panels.
Figure 7:
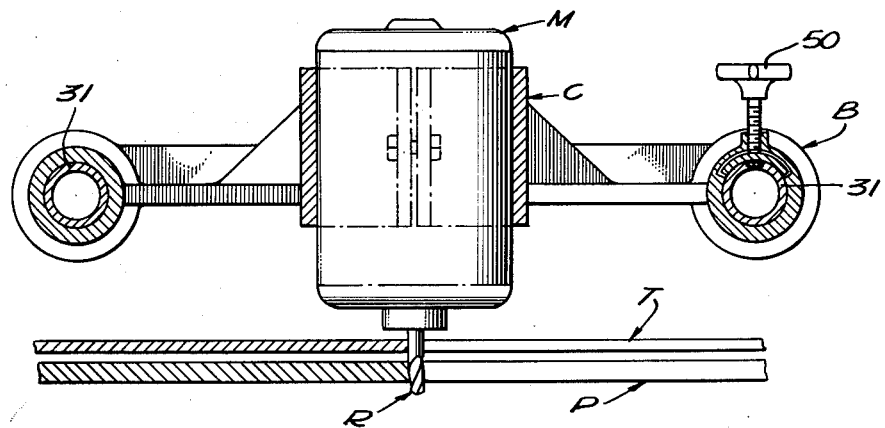
FIG. 7 is a sectional view taken along plane 7—7 of FIG. 6.
Figure 8:
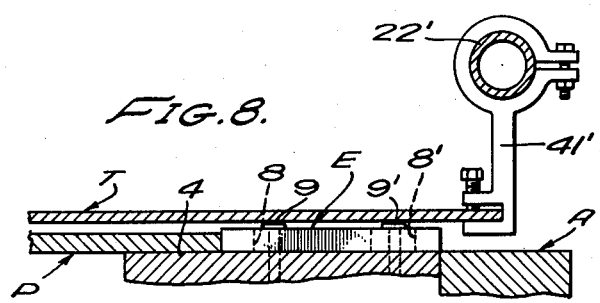
FIG. 8 is a sectional view taken along plane 8—8 of FIG. 6.

It is accordingly possible and practical where cut-out openings of a geometrical outline other than square and rectangular, such as round, oval, elliptical, diamond, etc., to superimpose in this area a template means T (see FIG. 6) to limit the path of movement of the bit R to such a geometrical outline other than square or rectangular. There are several different ways of mounting such a template T. The preferred way is to detachably mount the template T dependingly from the side tubular members 22–22' of the cutter frame C in overlying spaced relationship to the panel work piece P substantially as shown in FIG. 6. The particular manner in which this template T is detachably mounted on the side tubular members 22–22' may be widely varied without departure from the invention. In the instant specific embodiment template T is illustrated as being comprised of sheet metal having the required thickness, width and length suitable for the utility in view. The ends of the template T being detachably secured to the under surface of tubular members 22–22' by sliding clamp means 41–41'. The opening O in the template T which may be any desired geometrical shape other than square or rectangular and may be even square or rectangular if of a size smaller than the square or rectangular area defined by the stops 32 to 35 inclusive, defines the path of cutting travel of the router bit R when the shank of the bit R is held manually pressed against the sides of the opening O.

Underlying the bed D within the bed frame A is provided a dust collector bin H having a gravity feed exhaust outlet opening 42 connected to a suction pump (not shown) carrying the sawdust and boring debris to a dump site.

The specific embodiment of the profiling machine of the present invention as illustrated in drawings and as hereinabove described is operated as follows:

The cutter frame B is raised by manually operating valve 27 operating air cylinders 23–23' to its up position as indicated in dotted lines in FIG. 3. Link connected brace rods 21–21' and link connected brace rods 24–24' operate to stabilize the movement of the cutter frame B by preventing the development of torque due to one side raising sooner than the other as might be the case where the air cylinders are unevenly actuated. This can occur where most of the weight of the cutter frame B is on one side or the other of its center line.

When frame B is in its "up" position the panel work piece P is placed on the bed D and is moved to the right on the bed D until in contact with the adjustable stop means E which has been pre-set to the desired setting, and valve 15 of the panel gripping means F is then actuated to energize air cylinders 14, 14', 14" moving stops 16, 16', 16" to engage the side of the panel P and to move same against stops 17, 17' and 17" for grip engagement, stops 16, 16', 16" having been pre-set to accomplish this result.

Before moving cutter frame B to "Up" position the stops 32 to 35 are pre-set to define the desired sized square or rectangular opening to be cut in the panel P and are located thereon to position this opening in the desired place in the panel P and the cutter means C is moved over to its extreme right position and is secured in this position by means of clamps 50–50'.

When the panel has been secured in position the control valve 27 is moved manually to "Down" position and as the cutter frame B approaches its down position electric switch 51 is closed manually to energize motor M and to actuate router bit R before the bit R makes contact with the panel P. As the frame B reaches full down position the router bit R has completed its boring operation through the panel P and clamps 50–50' are released while the cutter means C is held manually in its position against stops 34'–35'. The cutter means C then is slidably moved manually forwardly towards stops 33–33'. When the forward movement of the means C is stopped by the stops 33–35' the sliding movement of cutter means C is then moved to the left along the front and rear tubular members 20'–20 from stops 34'–35' to stops 34–35. Then with the cutter means C held against stops 34–35 the sliding movement proceeds rearwardly along tubular members 31–31' until the cutter means C reaches stops 32–32'. The cutter means C then is moved to the right while held against stops 32–32' back to stops 34'–35' and forwardly to complete the cut, if necessary.

When the cut is completed, switch 51 is turned off, clamps 50–50' are locked and control valve 27 is moved to "up" position. As the cutter frame B moves upwardly the valve 15 is moved to "release" position and panel P and its cut-out is removed. This cycle of operations is repeated on successive panels P.

When template T is employed to produce cut-outs of geometrical designs other than square or rectangular, the sliding movement of the cutter means C proceeds along the path defined by the template T instead of the stops 33–35 by the engagement of the shank of bit R with the template T.

Having hereinabove disclosed the present invention generically and specifically and having described and illustrated one specific embodiment of the same, it is believed apparent that the invention is adapted for utility with a plurality of different kinds and composition of panel materials and that the panel P may consist of a stack of such panels P without departure from the invention and all such are contemplated as being within the scope of the invention and are to be construed as being included within the term "panel" as the term is hereinafter employed in the claims.

It is further believed apparent that some of the means and elements comprising the invention as they may be hereinafter described in the claims may be modified, changed or departed from without essential departure from the invention and all such modifications, changes and departures are contemplated as being within the scope of the invention and are to be considered as being included within the scope of the appended claims.

What I claim is:

1. Cutting apparatus comprising a bed frame, securing means adapted to secure a flat panel on said bed frame, cutting means adapted to cut said flat panel, mounting means movably mounting said cutting means on said bed frame so that said cutting means may be moved in any direction within a plane parallel to said panel when said panel is secured to said bed frame by said securing means whereby said cutting means may cut a recess in said panel having any desired peripheral configuration, and said cutting means including a rotatable cutting bit having an axis extending generally perpendicular to the plane of said panel, one end of said cutting bit extending below the top of said bed frame whereby said recess may be cut completely through said panel, said bed frame having a vertical opening therethrough and including support members extending across said opening for supporting said panel above said opening, said securing means including a fixed abutment secured to one edge of said bed frame, a movable abutment within said opening, both said abutments projecting above said opening, operating means connected to said movable abutment for moving it towards and away from said fixed abutment whereby said panel may be selectively gripped and released between the abutments, said operating means includes an elongated member extending across said opening and having spaced ends and a central portion secured to said movable abutment, one end of said elongated member being slidably mounted in said bed frame and the other end of said elongated member being connected to said bed frame by an extensible and contractible fluid motor.

2. Cutting apparatus comprising a bed frame, securing means adapted to secure a flat panel on said bed frame, cutting means adapted to cut said flat panel, mounting means movably mounting said cutting means on said bed frame so that said cutting means may be moved in any direction within a plane parallel to said panel when said panel is secured to said bed frame by said securing means whereby said cutting means may cut a recess in said panel having any desired peripheral configuration, and said cutting means including a rotatable cutting bit having an axis extending generally perpendicular to the plane of said panel, one end of said cutting bit extending below the top of said bed frame whereby said recess may be cut completely through said panel, said bed frame having a vertical opening therethrough and including support members extending across said opening for supporting said panel above said opening, said mounting means includes a rectangular frame surrounding said opening, said rectangular frame comprising a front member, a rear member and a pair of end members, said rear member being journalled on said bed frame so as to function as a pivot means for said rectangular frame, a pair of spaced parallel guide members extending between said front and rear members and slidably mounted thereon, a cutter base slidably mounted on said guide members and supporting said cutting means.

3. Cutting apparatus as defined in claim 2, including adjustable first stop members on said front and rear members for limiting lateral movement of said cutting means, and second stop means on said guide members for limiting forward and rearward movement of said cutting means.

4. Cutting apparatus as defined in claim 3, including post means extending upwardly from the rear of said bed frame above said rectangular frame, extensible and contractible power means mounted between the top of said post means and a central portion of said rectangular frame for pivoting said rectangular frame towards and away from said panel.

5. A cutting apparatus as defined in claim 4, including a horizontal rod pivotally mounted on the upper portion of said post means, a pair of parallel arms secured to ends of said horizontal rods, a pair of links each pivotally connected at one end to the free end of one of said arms and the other end of each link pivotally connected to a central portion of one of said end members.

6. Cutting apparatus comprising a bed frame, securing means adapted to secure a flat panel on said bed frame, cutting means adapted to cut said flat panel, mounting means movably mounting said cutting means on said bed frame so that said cutting means may be moved in any direction within a plane parallel to said panel when said panel is secured to said bed frame by said securing means whereby said cutting means may cut a recess in said panel having any desired peripheral configuration, and said cutting means including a rotatable cutting bit having an axis extending generally perpendicular to the plane of said panel, one end of said cutting bit extending below the top of said bed frame whereby said recess may be cut completely through said panel, said bed frame having a vertical opening therethrough and including support members connected to same frame so as to support said panel above said opening, said securing means including a fixed abutment secured to one edge of said bed frame, a movable abutment within said opening, both said abutments projecting above said opening, operating means connected to said movable abutment for moving it towards and away from said fixed abutment whereby said panel may be selectively gripped and released between the abutments, said operating means including an elongated member extending across said opening and having spaced ends and a central portion secured to said movable abutment, one end of said elongated member being slidably mounted in said bed frame and the other end of said elongated member being connected to said bed frame by an extensible and contractible power operating means.

7. Cutting apparatus comprising a bed frame, securing means adapted to secure a flat panel on said bed frame, cutting means adapted to cut said flat panel, mounting means movably mounting said cutting means on said bed frame so that said cutting means may be moved in any direction within a plane parallel to said panel when said panel is secured to said bed frame by said securing means whereby said cutting means may cut a recess in said panel having any desired peripheral configuration, and said cutting means including a rotatable cutting bit having an axis extending generally perpendicular to the plane of said panel, one end of said cutting bit extending below the top of said bed frame whereby said recess may be cut completely through said panel, said bed frame having a vertical opening therethrough and including support members connected to said frame so as to support said panel above said opening, said mounting means including a rectangular frame surrounding said opening, said rectangular frame comprising a front member, a rear member, and a pair of end members, said rear member being pivotly connected to said bed frame, a pair of spaced parallel guide members extending between said front and rear members and slidably mounted thereon, a cutter base slidably mounted on said guide members and supporting said cutter means.

8. Cutting apparatus as defined in claim 7 including first and second pairs of parallel hollow slide members, said first pair of slide members secured to said guide members and slidably receiving said front and rear members, said second pair of slide members secured to said cutter base and slidably receiving said parallel guide members.

References Cited in the file of this patent

UNITED STATES PATENTS

| | | |
|---|---|---|
| 1,054,936 | Perkins | Mar. 4, 1913 |
| 1,529,273 | Potter | Mar. 10, 1925 |
| 1,620,895 | Kandera | Mar. 15, 1927 |
| 1,796,879 | Werber | Mar. 17, 1931 |
| 1,865,759 | Hughes | July 5, 1932 |
| 1,958,203 | Pfau | May 8, 1934 |
| 2,044,481 | Manley et al. | June 16, 1936 |
| 2,265,064 | Day | Dec. 2, 1941 |
| 2,314,697 | Goff | Mar. 23, 1943 |
| 2,495,519 | Gregson et al. | Jan. 24, 1950 |
| 2,778,121 | Guerrant | Jan. 22, 1957 |
| 2,965,144 | Loewenthal | Dec. 20, 1960 |